United States Patent [19]

Dew

[11] Patent Number: 4,843,317

[45] Date of Patent: Jun. 27, 1989

[54] METHOD AND APPARATUS FOR MEASURING CASING WALL THICKNESS USING A FLUX GENERATING COIL WITH RADIAL SENSING COILS AND FLUX LEAKAGE SENSING COILS

[75] Inventor: Edward G. Dew, Houston, Tex.

[73] Assignee: Conoco Inc., Ponca City, Okla.

[21] Appl. No.: 259,953

[22] Filed: Oct. 18, 1988

[51] Int. Cl.⁴ .................. G01B 7/10; G01R 33/12; G01N 27/72; G01N 27/82

[52] U.S. Cl. .................................... 324/221; 324/229; 324/262

[58] Field of Search ............... 324/219, 220, 221, 229, 324/239, 242, 243, 262

[56] References Cited

U.S. PATENT DOCUMENTS

| | | | |
|---|---|---|---|
| 2,116,119 | 5/1938 | Loewenstein | 324/229 |
| 2,194,229 | 3/1940 | Johnston et al. | 324/232 |
| 2,315,943 | 4/1943 | De Lanty | 324/241 |
| 2,971,150 | 2/1961 | Prindle | 324/241 |
| 3,056,920 | 10/1962 | Herrald | 324/221 |
| 3,284,701 | 8/1966 | Kerbow | 324/227 |
| 3,417,325 | 12/1968 | McCullough et al. | 324/221 |
| 3,597,678 | 8/1971 | Fearon | 324/220 |
| 4,188,577 | 2/1980 | Mhatre et al. | 324/220 |
| 4,292,589 | 9/1981 | Bonner | 324/221 |
| 4,492,115 | 1/1965 | Kahil et al. | 73/151 |

Primary Examiner—Reinhard J. Eisenzopf
Assistant Examiner—Walter E. Snow

[57] ABSTRACT

A method and apparatus for measuring casing wall thickness using an axial main coil for generating a flux field enveloping the casing wall, and sensing actual field distribution by means of plural radial sensing coils each disposed at a radial position within the casing thereby to derive data sufficient to model a reference calibration for good casing wall structure; and, sensing flux leakage from the casing wall to detect anomalies of wall structure relative to the established reference calibration for output indication versus position along the casing.

11 Claims, 4 Drawing Sheets

METHOD AND APPARATUS FOR MEASURING CASING WALL THICKNESS USING A FLUX GENERATING COIL WITH RADIAL SENSING COILS AND FLUX LEAKAGE SENSING COILS

BACKGROUND OF THE INVENTION

1. Field of the Invention

The present invention relates to an electromagnetic device for the measurement of tubular goods wall thickness which includes additional coil sensing structure for defining the complete magnetic field distribution as between the main sensing coil and the tubular goods so that a direct indication of wall thickness can be obtained with the field strength measurements.

2. Description of the Prior Art

Various forms of electromagnetic casing inspection tool have been utilized for a long number of years. There are various types of pad-type electromagnetic tool which utilize a main sensing coil aligned generally axially through the casing in combination with a plurality of pad-type sensing coils maintained in contact with the inner casing wall to sense flux leakage variations thereby to derive a relative indication of any discontinuities or thinning walls in the casing. Examples of such prior casing testing tools are the VERTILOG TM system of Dresser Atlas Corporation, and the PIPE ANALYSIS LOG which is a system designed and operated by Schlumberger Corp. In these older types of tool, it was required to have a joint of good casing in order to establish a calibration reference from which subsequent findings of wall thickness might be compared. The drawback in this situation comes from the fact that such casing section cannot usually be found in an old installation having previous corrosion.

The U.S. Pat. No. 2,116,119 in the name of Loewenstein provides a teaching of the basic concept of a main energizing coil in combination with a sensing coil. The main coil is energized with an alternating current which provides a main flux field directed through a portion of the casing or flat sheet metal. This flux field induces voltage within the metal structure which results in eddy current flow which, in turn, generates a magnetic force field proportional to the metal thickness. This field is sensed by the sensing coil to provide a relative indication of wall thickness or, in extreme circumstances, a discontinuity. Various forms of this type of sensing structure have been devised in the past. U.S. Pat. No. 3,597,678 provides another coil arrangement wherein a flux gate is used to determine variations in the magnetic properties. U.S. Pat. No. 2,315,943 discloses yet another tubular goods testing system wherein an outer main coil works in conjunction with a cylindrical slug within the tubular member. Still other coils and configurations have been used variously in prior art attempts at wall thickness measurement and these findings are listed in the Information Disclosure Statement filed concurrently herewith.

SUMMARY OF THE INVENTION

The present invention utilizes a sonde structure for movement through well casing in order to position a main coil in axial alignment with the casing and a plurality of radial sensing coils intermediate the casing radius with a plurality of flux leakage sensing coils in close association with the casing inner wall. Remotely disposed circuitry then provides main coil energization while receiving sensed flux data from the radial coils and the flux leakage coils for preparation and input to a digital computer. The computer is programmed to determine the magnetic field force for the main coil and the casing for subsequent determination of field intensities that enable determination of the remaining wall thickness. The process enables direct readout of wall thickness without requiring an initial base or reference finding in order to calibrate thickness indication output. The general method may be used for measurement of wall thickness of structural tubing, pipeline, etc.

Therefore, it is an object of the present invention to provide a casing inspection tool that can detect and indicate general thinning of casing wall.

It is also an object of the invention to provide a casing tool which alleviates uncertainties as to wall thickness remaining due to variations in casing properties such as magnetic permeability and electrical resistivity of the steel.

It is still further an object of the present invention to provide a tubular goods inspection tool that finds accurate wall thickness without requiring establishment of a base reference that would require a joint of new or good tubular product.

Finally, it is an object of the invention to provide a casing inspection tool capable of rapidly providing a direct readout of wall thickness versus position along the casing.

Other objects and advantages of the invention will be evident from the following detailed description when read in conjunction with the accompanying drawings which illustrate the invention.

DETAILED DESCRIPTION OF THE INVENTION

Figure 1:
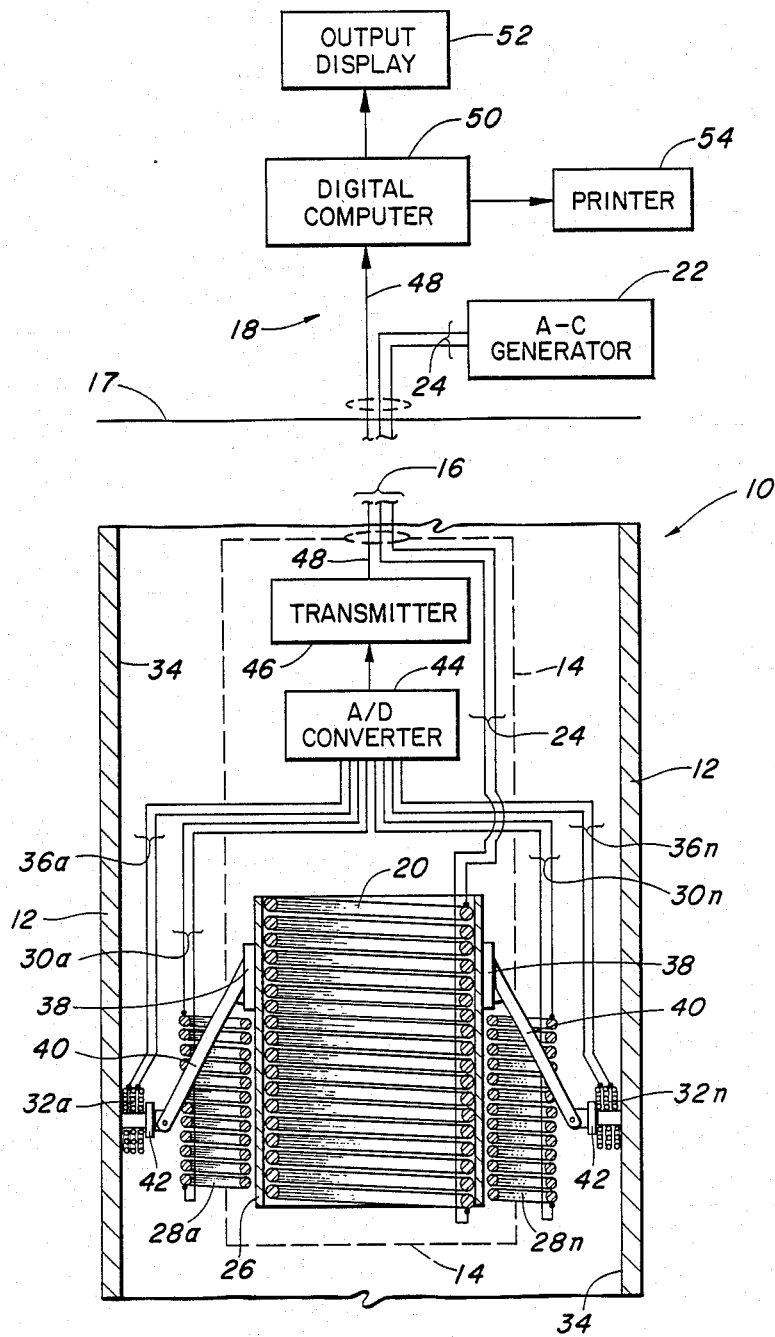
FIG. 1 is an idealized showing in vertical section and partial block diagram of the casing inspection tool and associated control circuitry.

FIG. 1 illustrates a magnetic casing inspection device 10 as it is disposed downhole within a section of well casing 12. The inspection device 10 consists of a frame or sonde housing 14, shown generally by dash-line, which is suitably connected to a multi-conductor logging cable 16 leading uphole to the surface control equipment 18. The housing 14 carries a main coil 20 that is axially aligned with the casing and formed from relatively heavier gauge wire to insure higher current carrying capacity. A suitable alternating current, e.g., 20 kilohertz AC current is supplied from the surface by an A-C generator 22 and a dual conductor connection 24 as applied to main coil 20. The main coil 20 when energized then provides an equally arrayed magnetic field distribution along the adjacent portion of casing 12.

Suitable support structure such as a cylindrical frame 26 is formed of suitable non-magnetic metal or plastic; that is, material suitable for supporting ancillary components but which will not interfere with the magnetic field flux distribution. A plurality of radial coils 28a thru 28n are suitably secured to be supported in parallel alignment with the main coil 20 and adjacent thereto within the radial space. The coils 28 are of lighter gauge wire and function as sensing coils with dual lead outputs provided on respective leads 30a thru 30n. In an early version of the tool, the radial coils 28 can be combined in series to obtain higher detection voltages or in parallel to obtain higher detection amperages.

Another plurality of flux leakage sensing coils 32a thru 32n are disposed in outwardly springing relationship for positioning closely adjacent the inner wall 34 of casing 12. Each of sensing coils 32a-32n is supported in equi-spaced circumferal relationship by means of a spring-loaded hinge bracket 38 and a support arm 40 affixed to respective coil holders 42. The hinged brackets 38 are suitably secured around the periphery of main coil frame 26. It should be understood that the internal supporting and positioning structure associated with main coil 20, radial sensing coils 28a-n and flux leakage sensing coils 32a-n may take any of various forms that are well-known to the skilled artisan. It is most important that the relative radial positioning of the coils be maintained, and the means for securing in position are not critical so long as they are structured from materials that do not distort or interrupt the induced magnetic fields.

Dual output leads 36a-36n from flux leakage sensing coils 32a-n are applied as input to an analog to digital converter 44. Similarly, all dual lead outputs 30a-30n from the radial sensing coils 28a-n are applied to analog to digital converter 44. The analog to digital converter 44 time averages the two classes of signals on leads 30a-n and 36a-n and each is converted to digital form for multiplexed output, e.g., time sequential, via transmitter 46 uphole on a conductor 48 of logging cable 16. Cable 16 leads up to a location on earth surface 17 for input to a digital computer 50, e.g., any of various well-known types of computer that is programmed for special purpose as will be further defined below. Various types of computer may be used. For example, the ROLM, Mini-VAX and PDP-II are presently available in the field for such service applications; however, still other types such as IBM PC, AT and XT computers may be readily utilized. The digital computer 50 includes a suitable output display 52 as well as a hard copy data printer 54 of well-known type. The output display 52 may include magnetic recorders such as tape, hard disc and/or floppy disc.

Figure 2:
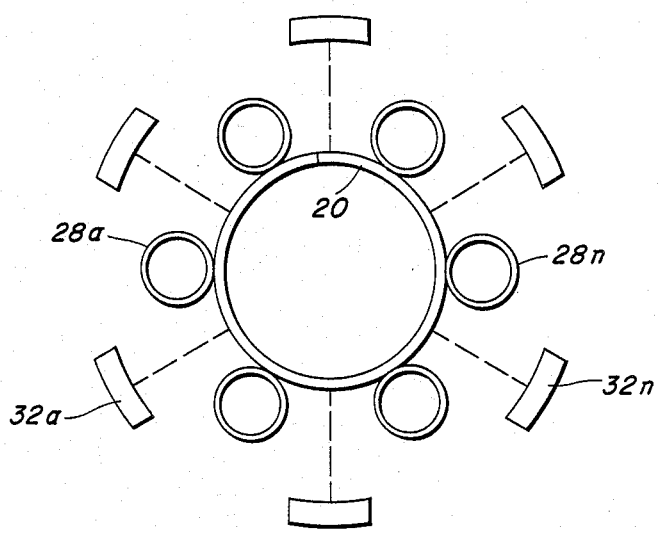
FIG. 2 is an idealized vertical plan view of inspection tool elements in one form.

FIG. 2 illustrates in top plan view one example of a coil layout. Thus, the main coil 20 is maintained in axial alignment with the casing itself as spring positioning of the flux leakage sensing coils 32a-n maintains concentricity. A plurality of six radial sensing coils 28a-n are secured in equi-spaced circumferal relationship adjacent main coil 20, and six equi-spaced, spring-urged flux leakage sensing coils 32a-n are spaced in alternating relationship to the radial sensing coils 28a-n. It should be understood that while pluralities of six radial coils 28 and flux leakage coils 32 are shown in deployment, the sonde apparatus may employ any number of such sensing coils, the location space being the controlling factor. Neither is it required that the sensing coils 32a-n be positioned in alternating relationship to the radial coils 28a-n since appropriate design may allow in-line disposition. It will generally occur, too, that the more coils employed, then the more reliable and accurate the sensed data.

Figure 3A:
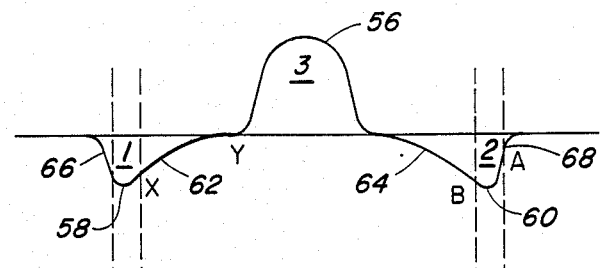
FIGS. 3A, 3B, and 3C are diagrams of magnetic field distributions for main coil and casing in three different casing conditions.
Figure 3B:
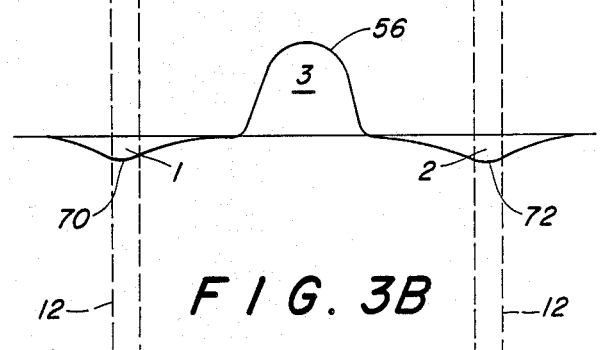
Figure 3C:
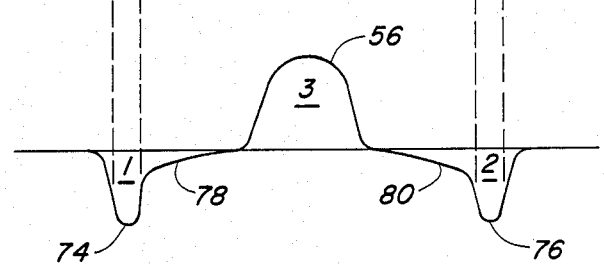

FIGS. 3A-3C illustrate the magnetic field distribution around the inspection device 10 during operation. Referring first to FIG. 3A, a symmetrical curve 56 defines an area 3 which represents the magnetic field that is generated by main coil 20 as it is centrally disposed in relation to the casing 12 sidewalls. The magnetic field generated in opposite side walls of casing 12 is represented by curves 58 and 60 defining non-symmetrical areas 1 and 2. The field distribution in the casing walls can be modeled, each from two respective curves. For example, the radial sensing coil values are used to establish the radial curves 62 and 64, while outer curves 66 and 68 will adhere to a predictable fall-off rate, thus defining the peaks f curves 58 and 60. It should then result that the sum of the fields 1 and 2 is equal to the field 3.

FIG. 3B represents the case for a section of casing 12 that is more resistive than that represented in 3A. With the more resistive metal casing, the magnetic field distribution within casing walls as represented by area curves 1 and 2 is of much less peak amplitude as curves 70 and 72 appear considerably flattened out. On the other hand, for a section of casing having less resistance, as in FIG. 3C, the casing field distribution curves 74 and 76 exhibit much higher peaks and a higher order of exponential increase at radial curves 78 and 80.

Figure 4:
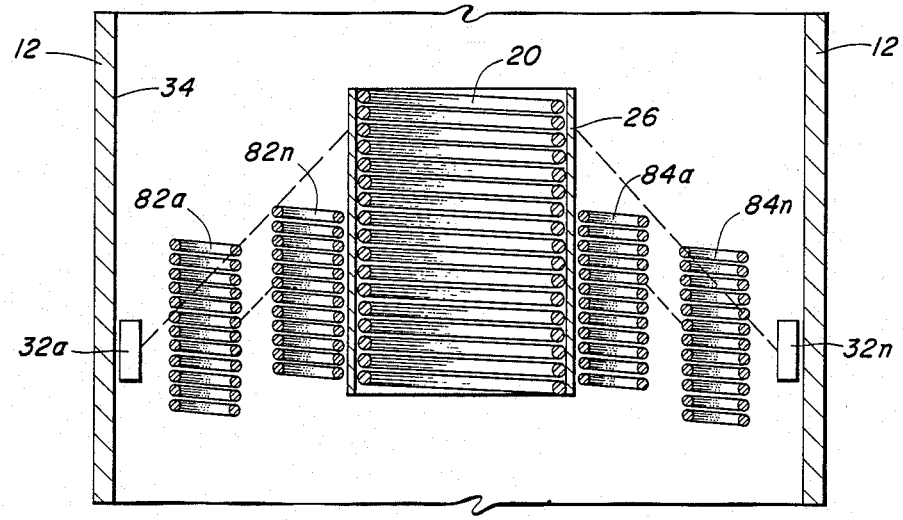
FIG. 4 is an idealized elevational view in section of an alternative form of radial coil arrangement.

FIG. 4 illustrates the manner in which the number of radial sensing coils can be increased thereby to give a higher order of accuracy in sensing the radial magnetic field. Thus, the main coil 20 will still be maintained in axial alignment with casing 12 as will the spring-urged flux leakage sensor coils 32a-32n disposed in circumferal array. Each radial sensing coil position will include plural coils in radial alignment extending outward from main coil 20. That is, coils 82a-82n may be arrayed outward for radial sensing and, in like manner, the opposite side coils 84a-84n are disposed in a linear radial array. Similarly, each circumferal radial sensing position will include a similar radial alignment of plural coils and a respective flux leakage sensing coil 32 will be disposed proximate each sensing position. The use of plural radial sensing coils provides greater sensitivity to the magnetic flux distribution sensed relative to curve 62, 64 (FIG. 3A) thereby to provide a better, more accurate peak value for curves 58, 60. In general, the use of double radial sensing coils results in a second order accuracy, using triple coils results in third order accuracy, etc.

In operation, the inspection device 10 is suspended for controlled movement upward or downward within the casing 12 to be tested. The inspection device 10 is suspended by a logging cable 16 that is winch controlled from machinery (not shown) located on earth surface 17. Included at surface 17 is an A-C generator operating at the prescribed frequency and current values which provides energizing voltage downhole on leads 24 to energize the main coil 20.

Usually, the inspection tool 10 will be located downward within the casing string and brought upward at a predetermined speed during which the casing testing readings are taken. That is, the main coil 20 is energized to provide a strong, central flux field for envelopment of the casing 12 while the plurality of radial sensing coils 28a-n and the plurality of flux leakage sensing coils 32a-n provide inductive voltage readings on their respective dual wire leads for input to the analog/digital converter 44. Output from the converter 44 is then applied through multiplexing transmitter 46 wherein digital signal values are time sequentially transmitted uphole by means of lead 48 to the digital computer 50. The digital computer 50 will have been prepared with all pertinent information regarding casing type, i.e., casing resistivity, diameter, wall thickness, etc., and such information is set into the computer for coaction with the software which carries out the procedures for deriving variations in casing wall thickness. These variations in wall thickness are then provided at output display or recorder 52 and printer 54 to provide a readout in accordance with casing position so that faults may be later located for isolation.

Figure 5:
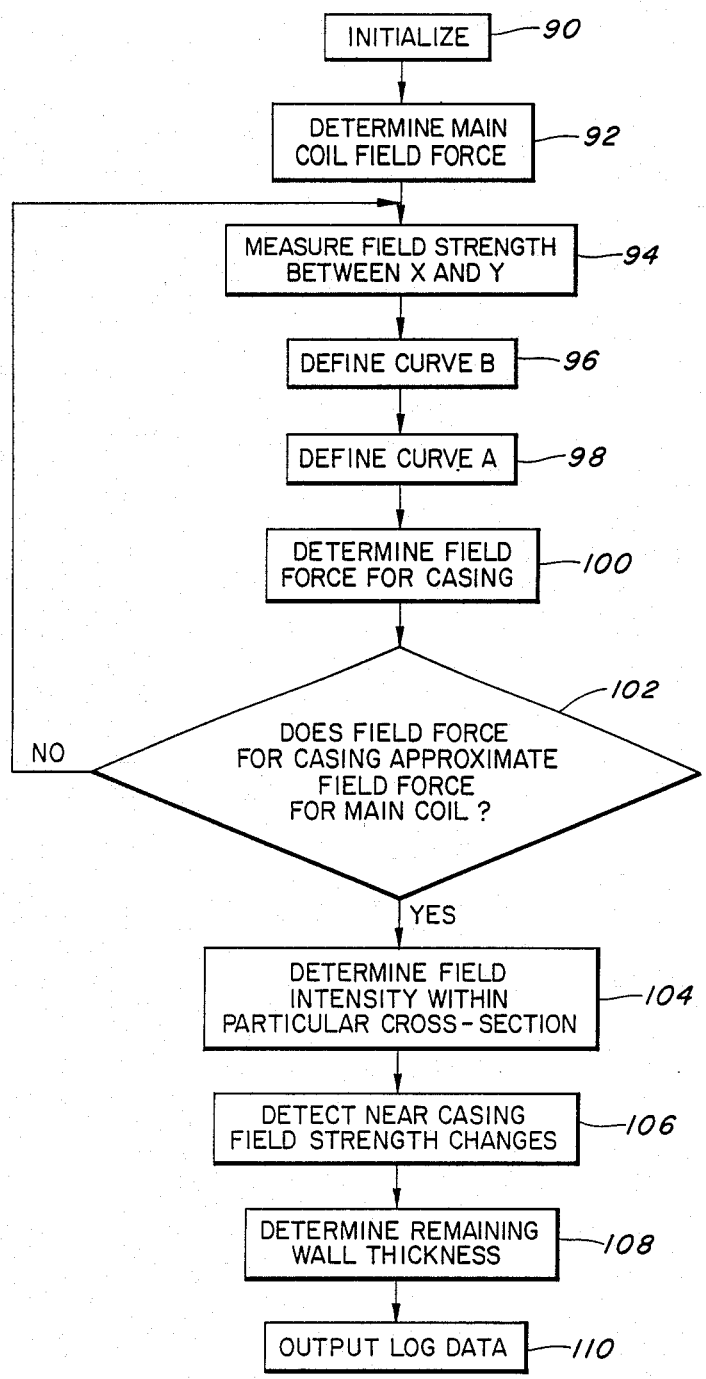
FIG. 5 is a flow diagram of software procedure for processing and providing data output of casing wall thickness.

The program functions in accordance with the flow diagram of FIG. 5. The computer 50 is initialized at stage 90 to set in all constant data regarding the type of casing. Each type of casing will carry predetermined constants applicable to new casing such as diameter, weight, wall thickness, resistivity, permeability, etc. These constants are set into the computer for interaction with the various operative calculations. Flow stage 92 functions to determine the main coil field force. This may be done by a calculation determining the power consumption minus the resistive and inductive losses. The field force amounts to the area labeled "3" as bounded by curve 56 in FIGS. 3A-C.

Flow stage 94 measures the field strength between points X and Y, i.e., the radial curve 62 (FIG. 3A). This field strength is measured by the sensing coils 28$a$–$n$. Thus, a value is measured for a single radial sensing coil 28 and then the value is multiplied by the number of sensing coils in the circumference. Alternatively, a more exact X-Y data reading may be gained utilizing plural radial coil arrays such as 82$a$–82$n$ (FIG. 4). This measured field strength is then utilized with the radial distance from the center line or axis of the main coil 20 to define the curve 62 or curve B as at flow stage 96. With a peak estimate value of curve B derived, then flow stage 98 defines curve 68 (FIG. 3A) or curve A. One of the assumptions previously mentioned with respect to field distribution in the casing was that it could be modeled with the two curves A and B (68 and 64) and, depending upon the field distribution and resistance of the casing, a family of curves is established and readily set into the computer with particular casing type information.

Flow stage 100 functions to calculate the field force for the casing 12 using the sum of the cross-sectional field forces, as calculated from curves A and B, multiplied by their cross-sectional area. That is, first the field force is calculated from the finding for curves A and B, then this value is multiplied by the circular cross-sectional area of the casing. At this point it is required that a comparison be made between the field forces for casing and those for the main coil 20. This is done in decision stage 102 and if the values are not close to equal then the program recycles to step 94 to redetermine the field strength values until a close comparison is achieved.

When the field force for the casing 12 approximates the field force for the main coil 20, there is then a basis for measurement wherein any variations detected by the flux leakage coils 32 will be purely due to variations in wall thickness. In flow stage 104 there is performed an integration of the field strength curve over the casing thickness to calculate the field force in the casing. That is, the area under curves A and B (e.g., 64, 68), and within the dash lines defining casing 12 is found by integration. This represents the actual field force in the casing wall itself. This field force in casing is then divided by the casing cross-sectional area to find the field intensity of flux per unit area within the casing wall.

Flow stage 106 then takes a measure of near casing field strength by means of the flux leakage sensing coils 32$a$–$n$. There may be a number of such coils, typically from 8 to as many as 20 flux leakage sensing coils, this depending upon the diameter of the casing. A field strength measurement amounts to a summation of the circumfery of flux leakage sensing coils 32$a$–$n$ which may then be divided by the coil's cross-section area, i.e., the area of the coil's diameter, to produce a measure of field intensity. Flow stage 108 then determines the remaining wall thickness which is calculated as the field intensity in good casing minus the flux leakage coil intensity times the wall thickness in good casing. The unit is initially calibrated in terms of good casing so that these constants are set into the system.

The wall thickness data is then output at flow stage 110 for compilation as a well log for the particular casing installation. The system has distinct advantages in that the data log reads directly in terms of wall thickness and no base logs are required in order to establish accurate thicknesses. Initial calibration relative to good casing is all that is required for subsequent usage. The well log device is capable of identifying general wall thinning and not just abrupt departures resulting from deep pitting and the like. Base calibration may be achieved using only three to four feet of relatively good casing having no losses, and such portions of casing are nearly always to be found around the surface installation.

It may be quite useful to obtain eddy current measurements simultaneous with inspection procedures. Thus, the eddy current measurements may be made in conjunction with the flux leakage measurements to provide an additional data parameter. The recording of all three sets of data, i.e. radial coils, flux leakage coils, and eddy current detector coils, will allow additional computer analysis thereby to interpret more fully the condition of the tubular goods.

Changes may be made in combination of elements as heretofore set forth in the specification and shown in the drawings; it being understood that changes may be made in the embodiments disclosed without departing from the spirit and scope of the invention as defined in the following claims.

What is claimed is:

1. A casing wall inspection device controlled at an earth surface position for continual testing of well casing, comprising:

a main coil axially aligned with the casing axis;

means for energizing said main coil with an alternating current voltage to produce a primary flux distribution enveloping the casing adjacent said main coil;

a plurality of radial sensing coils disposed in equispaced circumfery with each radial sensing coil placed radially outward from said main coil and providing a radial output;

a plurality of flux leakage sensing coils supported in equal spacing in surround of said radial sensing coils and spring-urged against said casing wall with each providing a flux leakage output;

transmitter means receiving input of said plural radial outputs and plural flux leakage outputs and transmitting a signal containing the radial and flux leakage outputs; and control means at said earth surface position for receiving said signal for processing to derive a continual evaluation of casing wall thickness.

2. A device as set forth in claim 1 which is further characterized to include:

a frame member for securely supporting said main coil, said plurality of radial sensing coils and said plurality of spring-urged flux leakage sensing coils; and a control cable movably supporting said frame member within the casing from the earth surface position.

3. A device as set forth in claim 2 wherein said control cable comprises:

an armored cable for supporting the weight of said frame member; and plural conductors interconnecting between said transmitter means and said control means.

4. A device as set forth in claim 3 wherein said means for energizing comprises:

an A-C generator located at said earth surface position to supply A-C voltage of predetermined frequency to selected ones of said plural conductors.

5. A device as set forth in claim 1 wherein each of said radial sensing coils comprises:

a coil of lesser size than said main coil with the coil axis aligned in parallel with the main coil axis.

6. A device as set forth in claim 1 wherein each of said flux leakage sensing coils comprises:

a coil of lesser size than said main coil with the coil axis aligned perpendicular to the casing wall.

7. A device as set forth in claim 5 wherein each of said flux leakage sensing coils comprises:

a coil of lesser size than said main coil with the coil axis aligned perpendicular to the casing wall.

8. A device as set forth in claim 1 wherein said control means comprises:

a computer receiving said signal from the transmitter means and processing to provide casing wall output data; and visual indicator means displaying said output data.

9. A device as set forth in claim 1 wherein said transmitter means comprises:

analog to digital converting means receiving all of said radial and flux leakage outputs and producing a time sequential digital signal; and a transmitter for transmitting a multiplexed digital signal to said control means.

10. A device as set forth in claim 9 wherein said control means comprises:

a computer receiving said digital signal from the transmitter means and processing to provide casing wall output data; and visual indicator means displaying said output data.

11. A method for providing continual output of casing wall thickness comprising:

determining a standard field intensity for good casing;

producing a main magnetic field centrally in said casing with the magnetic poles aligned with the casing axis;

determining the field force for said main magnetic field;

sensing magnetic field strength at a radial point relative to said casing axis;

using the magnetic field strength and the radial distance of sensing point from the casing axis to define a field distribution about said casing wall;

determining the field force for the entire casing circumfery;

determining the field intensity for the entire casing circumfery;

determining near casing magnetic field intensity;

subtracting the near casing field intensity times the wall thickness of good casing from the field intensity in good casing to produce a wall thickness output; and recording said wall thickness output for display.

* * * * *